US010739988B2

(12) United States Patent
Simmons et al.

(10) Patent No.: US 10,739,988 B2
(45) Date of Patent: Aug. 11, 2020

(54) PERSONALIZED PERSISTENT COLLECTION OF CUSTOMIZED INKING TOOLS

(71) Applicant: Microsoft Technology Licensing, LLC, Redmond, WA (US)

(72) Inventors: Alex Jacob Simmons, Kirkland, WA (US); Lisa Carolyn Cherian, Woodinville, WA (US); L. Tucker Hatfield, Kirkland, WA (US); Sarah Elizabeth Sykes, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 286 days.

(21) Appl. No.: 15/344,433

(22) Filed: Nov. 4, 2016

(65) Prior Publication Data

US 2018/0129366 A1 May 10, 2018

(51) Int. Cl.
*G06F 3/0488* (2013.01)
*G06F 3/0354* (2013.01)
(Continued)

(52) U.S. Cl.
CPC .......... *G06F 3/04883* (2013.01); *G06F 3/038* (2013.01); *G06F 3/03545* (2013.01); *G06F 3/04845* (2013.01); *G06F 40/171* (2020.01)

(58) Field of Classification Search
CPC .. G06F 3/04883; G06F 3/04845; G06F 3/038; G06F 3/03545; G06F 17/242
See application file for complete search history.

(56) References Cited

U.S. PATENT DOCUMENTS 7,106,343 B1 * 9/2006 Hickman ................ G06T 11/40
345/589
7,353,453 B1 * 4/2008 Simmons .............. G06F 17/241
345/173
(Continued)

FOREIGN PATENT DOCUMENTS

WO 2015100715 A1 7/2015

OTHER PUBLICATIONS

"S Note", Retrieved on: Aug. 29, 2016 Available at: https://www.microsoft.com/en-us/store/p/s-note/9wzdncrfhwg6#.
(Continued)

*Primary Examiner* — Nicholas Klicos

(57) ABSTRACT

A personalized persistent collection of customized inking tools is provided. In an ink-enabled application, a user is enabled to create new inking tools and to select properties to associate with the new inking tools according to the user's wants/needs. Inking tool elements illustrative of the properties associated with the user-customized inking tools are included in an inking tool tray displayed in a UI of the application. The user-selected properties associated with the user-customized inking tools are stored in a data store that is accessible by the application and other applications from various computing devices. The inking tool tray is consistent across applications and computing devices for allowing the user to create, keep, and roam a customized set of inking tools, and providing the user with one-click access to the user's customized inking tools. Advantageously, the user does not have to repeatedly set up an inking tool with often-used attributes.

18 Claims, 14 Drawing Sheets

(51) Int. Cl.
  *G06F 3/038* (2013.01)
  *G06F 3/0484* (2013.01)
  *G06F 40/171* (2020.01)

(56) References Cited

U.S. PATENT DOCUMENTS

| | | | |
|---|---|---|---|
| 8,638,303 B2 | 1/2014 | Harris et al. | |
| 8,692,847 B2 | 4/2014 | Bhatt et al. | |
| 8,963,891 B2 | 2/2015 | Mesaros et al. | |
| 2004/0225968 A1* | 11/2004 | Look | G06F 3/0481 715/778 |
| 2005/0144090 A1* | 6/2005 | Gadamsetty | G06Q 30/0601 705/26.1 |
| 2005/0262481 A1* | 11/2005 | Coulson | G06F 9/451 717/120 |
| 2006/0230351 A1* | 10/2006 | Stehle | G06T 19/00 715/700 |
| 2007/0094328 A1* | 4/2007 | Birch | G06Q 10/10 709/204 |
| 2007/0130541 A1* | 6/2007 | Louch | G06F 9/451 715/804 |
| 2007/0216684 A1* | 9/2007 | Hsu | G06T 11/60 345/441 |
| 2009/0228838 A1* | 9/2009 | Ryan | G06F 8/38 715/853 |
| 2009/0231356 A1* | 9/2009 | Barnes | G06F 3/0482 345/594 |
| 2010/0281374 A1* | 11/2010 | Schulz | G06F 3/0482 715/723 |
| 2011/0175821 A1* | 7/2011 | King | G06F 3/04883 345/173 |
| 2012/0105383 A1 | 5/2012 | Silverbrook et al. | |
| 2012/0210261 A1* | 8/2012 | Sarnoff | G06F 3/04845 715/765 |
| 2013/0120436 A1* | 5/2013 | Krishnaswamy | G06T 11/40 345/594 |
| 2013/0127910 A1* | 5/2013 | Tijssen | G06F 3/04883 345/642 |
| 2013/0132959 A1* | 5/2013 | Moore | G06Q 50/01 718/100 |
| 2013/0235074 A1* | 9/2013 | Cherna | G06T 11/60 345/619 |
| 2013/0239056 A1 | 9/2013 | Ubillos et al. | |
| 2013/0326381 A1* | 12/2013 | Pereira | G06F 3/04845 715/765 |
| 2014/0013254 A1* | 1/2014 | Hosein | G06F 3/04817 715/765 |
| 2014/0040789 A1 | 2/2014 | Munter et al. | |
| 2014/0081610 A1* | 3/2014 | DiVerdi | G06T 11/203 703/6 |
| 2014/0165006 A1* | 6/2014 | Chaudhri | G06F 3/04817 715/835 |
| 2014/0229873 A1 | 8/2014 | Tremblay et al. | |
| 2014/0272863 A1* | 9/2014 | Kim | G09B 23/28 434/262 |
| 2014/0337748 A1 | 11/2014 | Lee | |
| 2015/0058807 A1* | 2/2015 | Anderson | G06F 3/04812 715/825 |
| 2015/0154444 A1 | 6/2015 | Kurita | |
| 2016/0179335 A1* | 6/2016 | Thompson | G06F 3/041 345/173 |
| 2016/0260229 A1* | 9/2016 | Natzke | G06T 11/60 |

OTHER PUBLICATIONS

Martin, James A., "Putting Apple Pencil to work with Evemote, OneNote and Notability", Published on: Dec. 4, 2015 Available at: http://www.cio.com/article/3012002/mobile-apps/putting-apple-pencil-to-work-with-evernote-onenote-and-notability.html.

"Use a pen to draw, write, or highlight text on a Windows tablet", Published on: Sep. 9, 2015 Available at: https://support.office.com/en-us/article/Use-a-pen-to-draw-write-or-highlight-text-on-a-Windows-tablet-6d76c674-7f4b-414d-b67f-b3ffef6cof53.

Runciman, Kyle, "Guide to Custom Brushes", http://cdn.sketchbook.com/blog/wp-content/uploads/2015/08/kyle-tutorial_Brushes.pdf, Nov. 2, 2012, pp. 1-15.

* cited by examiner

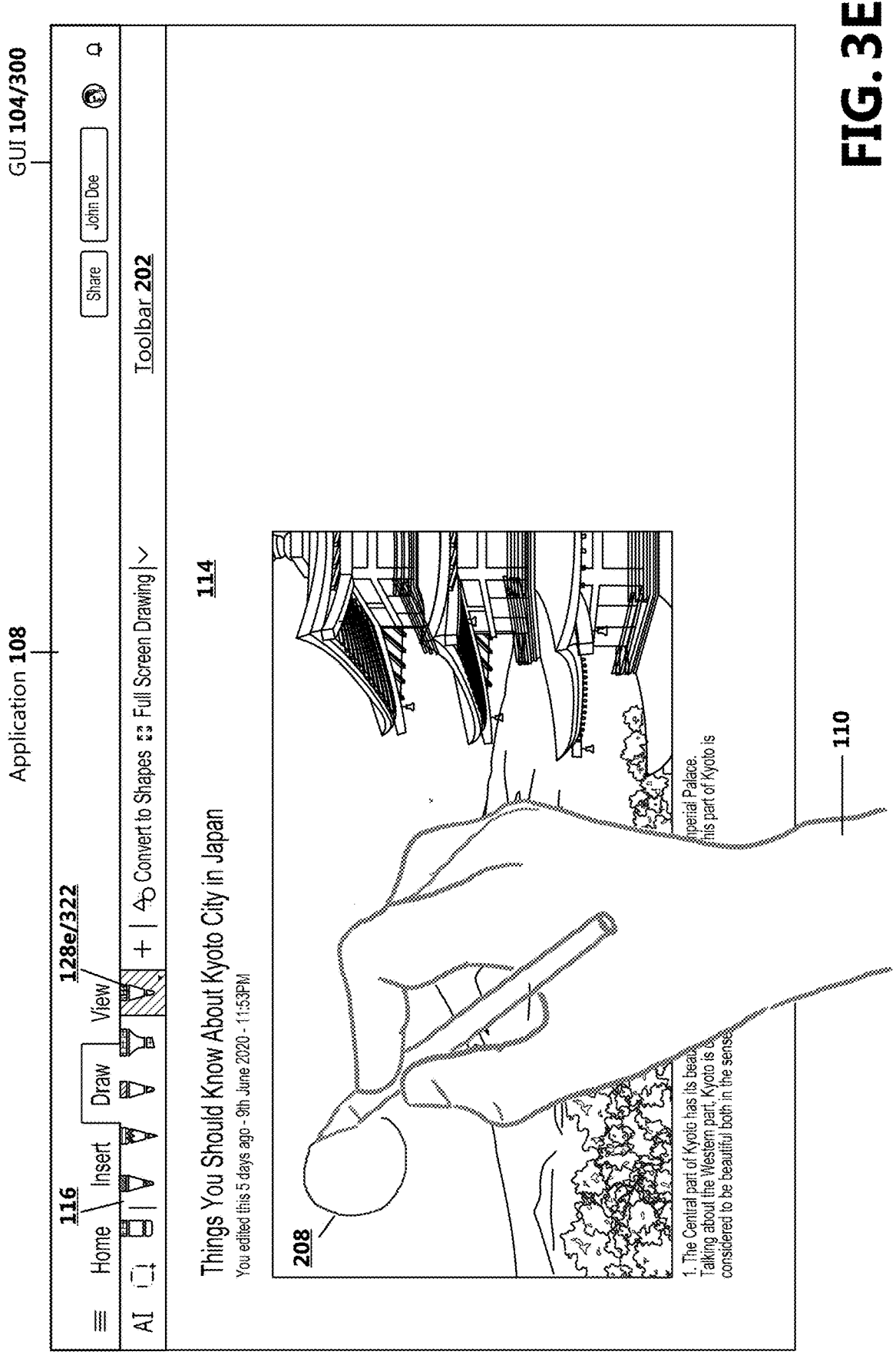

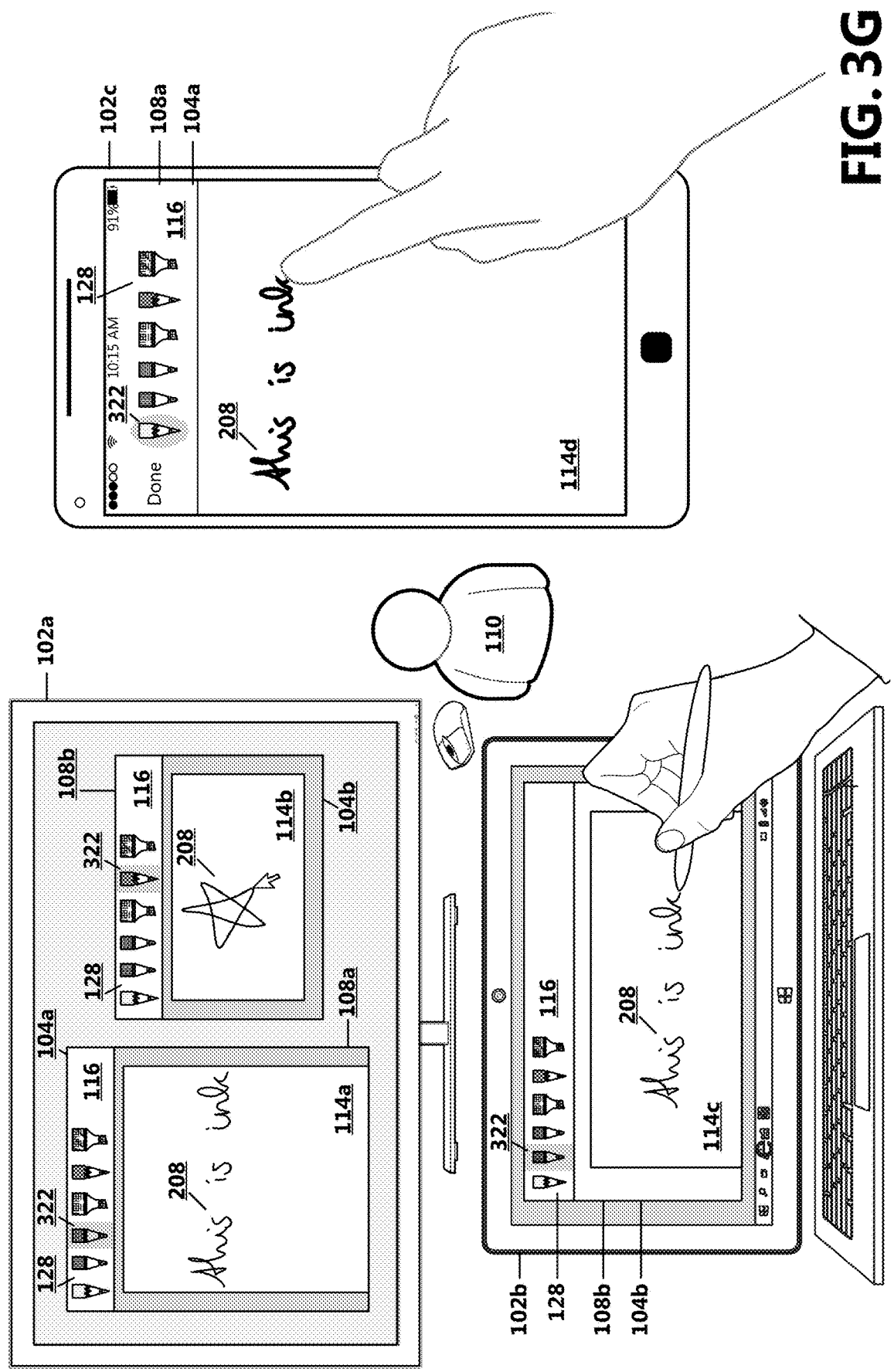

MOBILE COMPUTING DEVICE

PERSONALIZED PERSISTENT COLLECTION OF CUSTOMIZED INKING TOOLS

BACKGROUND

Various types of computing devices and a variety of software applications enable "inking" input, wherein a user composes text, drawings, or highlighting from one or a plurality of stroke inputs, sometimes referred to as digital ink. For example, some computing devices accept stroke input via natural user interface input methods (e.g., touch, gesture), via a handwriting input device (e.g., a digital pen or stylus), or by movement of a mouse pointer, touchpad pointer, etc.

Much like in the "real world" where individuals oftentimes have a preference for a certain pen type or color or use certain pens or tools for specific tasks, users of ink-enabled applications frequently use a select set of inking tools on a regular basis. For example, in an educational setting, a class may have a defined color coding for notes that students are required to follow, or teachers may use certain colored pens of a defined thickness for grading assignments.

Computer and software users have grown accustomed to user-friendly software applications that provide intuitive graphical user interfaces and efficient user experiences. Many ink-enabled applications provide options for users to select certain attributes (e.g., color, stroke thickness) for an inking tool; however, attributes are typically selected separately. For example, to start inking, a user may select a tool (e.g., pen, pencil, or brush) and then select a color or ink effect to apply to the tool. Further, inking tool attributes aren't saved after an application is closed, nor are inking tool attributes shared across applications or devices. Accordingly, a user may have to reconfigure inking tool attributes each time she opens an application, thus increasing the workload on the user, and requiring additional system resources to configure an inking tool each time the user needs to use a particular tool. As can be appreciated, this can be inefficient and frustrating to a user who frequently and repeatedly uses a same set of inking tool attributes.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for providing a personalized persistent collection of customized inking tools. When using an ink-enabled application, a user is enabled to create new inking tools and to select properties to associate with the new inking tools according to the user's wants/needs. Inking tool elements illustrative of the properties associated with the user-customized inking tools are included in an inking tool tray that is displayed in a user interface of the ink-enabled application. The user-selected properties associated with the user-customized inking tools are stored in a data store that is accessible by the application and other applications from various computing devices. Accordingly, when the user opens the application or another ink-enabled application, the inking tool tray is displayed in the user interface to provide the user with one-click access to the user's customized inking tools. The inking tool tray is consistent across applications and computing devices for allowing the user to create, keep, and roam a customized set of inking tools. Advantageously, the user does not have to repeatedly set up an inking tool with her preferred attributes, decreasing the workload on the user, and requiring fewer system resources to maintain a persistent collection of inking tools.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 3E is an illustration of an example user interface display generated by aspects of an ink-enabled application showing setting a current inking tool for providing inking input in the content authoring canvas to assume properties of the new inking tool;

FIG. 3G is an illustration of example user interface displays including a persistent collection of inking tools generated by aspects of various ink-enabled applications on a variety of computing devices;

DETAILED DESCRIPTION

Figure 1:
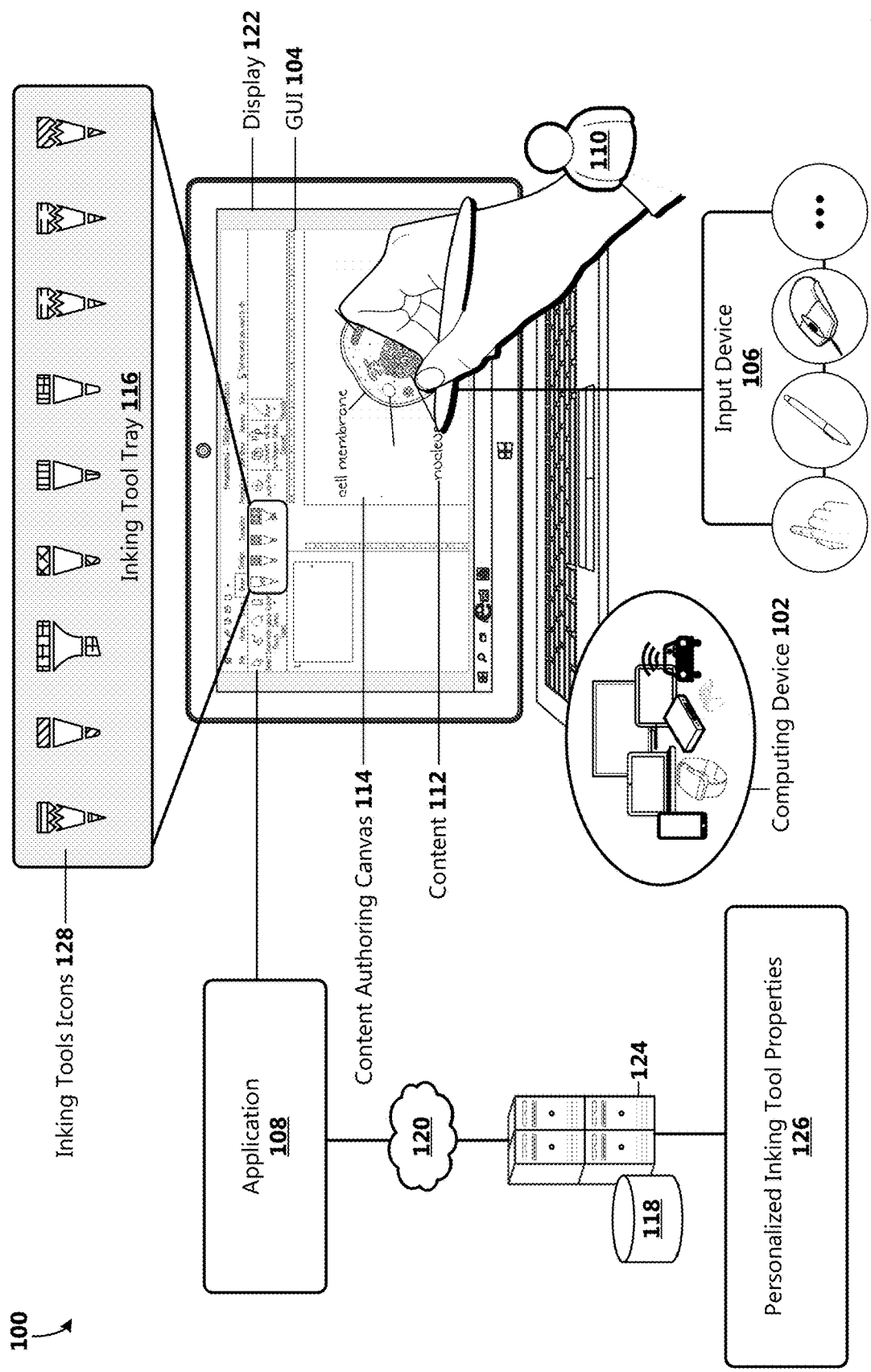
FIG. 1 is a simplified block diagram showing an example operating environment including components of a system for providing a personalized persistent collection of customized inking tools.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for providing a personalized persistent collection of customized inking tools. The inking tool collection is consistent across applications and computing devices for allowing the user to create, keep, and roam a customized set of inking tools for adding inking input in a content authoring canvas. With reference now to FIG. 1, a block diagram of an example operating environment 100 illustrating aspects of an example system for providing a personalized persistent collection of customized inking tools is shown. The example operating environment 100 includes an electronic computing device 102. The computing device 102 illustrated in FIG. 1 is illustrated as a tablet computing device; however, as should be appreciated, the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications 108 for performing a variety of tasks. The hardware of these computing devices is discussed in greater detail in regard to FIGS. 5, 6A, 6B, and 7.

A user 110 may utilize an application 108 on the computing device 102 for a variety of tasks, which may include, for example, to write, calculate, draw, take and organize notes, organize, prepare presentations, send and receive electronic mail, make music, and the like. Examples of suitable applications 108 include, but are not limited to, word processing applications, spreadsheet applications, slide presentation applications, electronic mail applications, drawing applications, note-taking applications, web browser applications, and game applications. Applications 108 may include thick client applications 108, which are stored locally on the computing device 102, or may include thin client applications 108 (i.e., web applications) that reside on a remote server and accessible over a network. A thin client application 108 may be hosted in a browser-controlled environment or coded in a browser-supported language and reliant on a common web browser to render the application 108 executable on the computing device 102.

According to examples, the application 108 is a program that is launched and manipulated by an operating system, and manages content 112 within a content authoring canvas 114 and published on a display screen 122. Aspects of the application(s) 108 are operative to generate and provide a graphical user interface (GUI) 104 that allows a user 110 to interact with application functionality and electronic content. In various examples, the GUI 104 includes a toolbar, comprising various tools and settings related to authoring the content, and a content region display area, in which the content authoring canvas 114 of a document content file is displayed. According to an aspect, the application 108 is an ink-enabled application that is operative to receive handwritten or hand-drawn input collected from an input device 106, such as a tablet pen, a finger, a mouse, or other device, and to visually represent the input on an ink-enabled element, such as the content authoring canvas 114. The handwritten or hand-drawn input may be comprised of one or a plurality of digital strokes, and is referred to herein as "inking" input.

In examples, the application 108 receives input from the user, such as text input, drawing input, inking input, etc., via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence. The user input results in content 112 being added to the content authoring canvas 114. Examples of a content authoring canvas include a page in a document content file, a spreadsheet in a spreadsheet content file, a slide in a presentation content file, a page in a notes content file, etc.

Aspects of the application 108 provide an inking tool tray 116 for displaying a plurality of selectable inking tool elements 128, wherein each inking tool element 128 corresponds with an inking tool having a set of inking tool properties 126 selected by the user 110 for the particular inking tool. For example, the user 110 is enabled to use the inking tool for providing inking input within the content authoring canvas 114. Non-limiting examples of inking tools include pencils, pens, marker pens, highlighters, and other drawing implements.

According to an aspect, the inking tool elements 128 illustrate the user-selected properties 126 for the corresponding inking tool. In some examples, each inking tool element 128 is an image or a portion of an image of the actual or "real-world" drawing implement it represents. For example, the inking tool element 128 for a red pen inking tool may be displayed as a pen tip having red ink and a barrel resembling an actual pen. In one example, the inking tool elements 128 have a photo-realistic likeness to "real-world" drawing implements having the same properties 126. Displaying inking tool elements 128 that illustrate the user-selected properties 126 for the corresponding inking tool advantageously enables the user 110 to easily distinguish between the inking tools and to intuitively and efficiently select the drawing tool of choice for providing inking input within the content authoring canvas 114.

According to an aspect, providing selectable inking tool elements 128 corresponding to customized inking tools provides efficient one-click access to the customized drawing tools, eliminating the inefficient need for the user 110 to select inking tool properties 126 each time the user wants to use an often-used inking tool, each time the user restarts the application 108, or when the user opens the application on a different computing device 102. In some examples, a selectable inking tool element 128 is displayed as an ink stroke having the properties of its corresponding inking tool. In other examples, a selectable inking tool element 128 is displayed as a list item that illustrates the properties of its corresponding inking tool. As should be appreciated, other selectable inking tool element 128 display types are possible and are within the scope of the present disclosure.

Aspects of the application 108 provide for enabling the user 110 to add an inking tool to the inking tool tray 116 and to select one or more properties to assign to the inking tool. For example, the application 108 is operative to provide a functionality for adding an inking tool and a customization menu selecting a particular color, thickness, or ink effect to apply to the inking tool. When an inking tool is added, the user-selected properties 126 for the inking tool are saved. According to an aspect, the application 108 is operative to communicate with a server computing device 124 over a network 120, such as the Internet or an intranet. In the example shown in FIG. 1, the server computing device 124 includes a data store 118 for storing user-selected inking tool properties 126 associated with a plurality of personalized inking tools. Various applications 108 and computing devices 102 are enabled to communicate with the server computing device 124 for retrieving the personalized inking tool properties 126. In one example, the computing device 102 includes a personalized inking tool application programming interface (API), operative to enable the application 108 to retrieve the inking tool tray 116 via stored instructions. Accordingly, the inking tool tray 116 is consistent across applications 108 and computing devices 102, allowing the user 110 to create, keep, and roam a customized set of inking tools. In some examples, a copy of the user-selected inking tool properties 126 is stored locally on the computing device 102.

Figure 2:
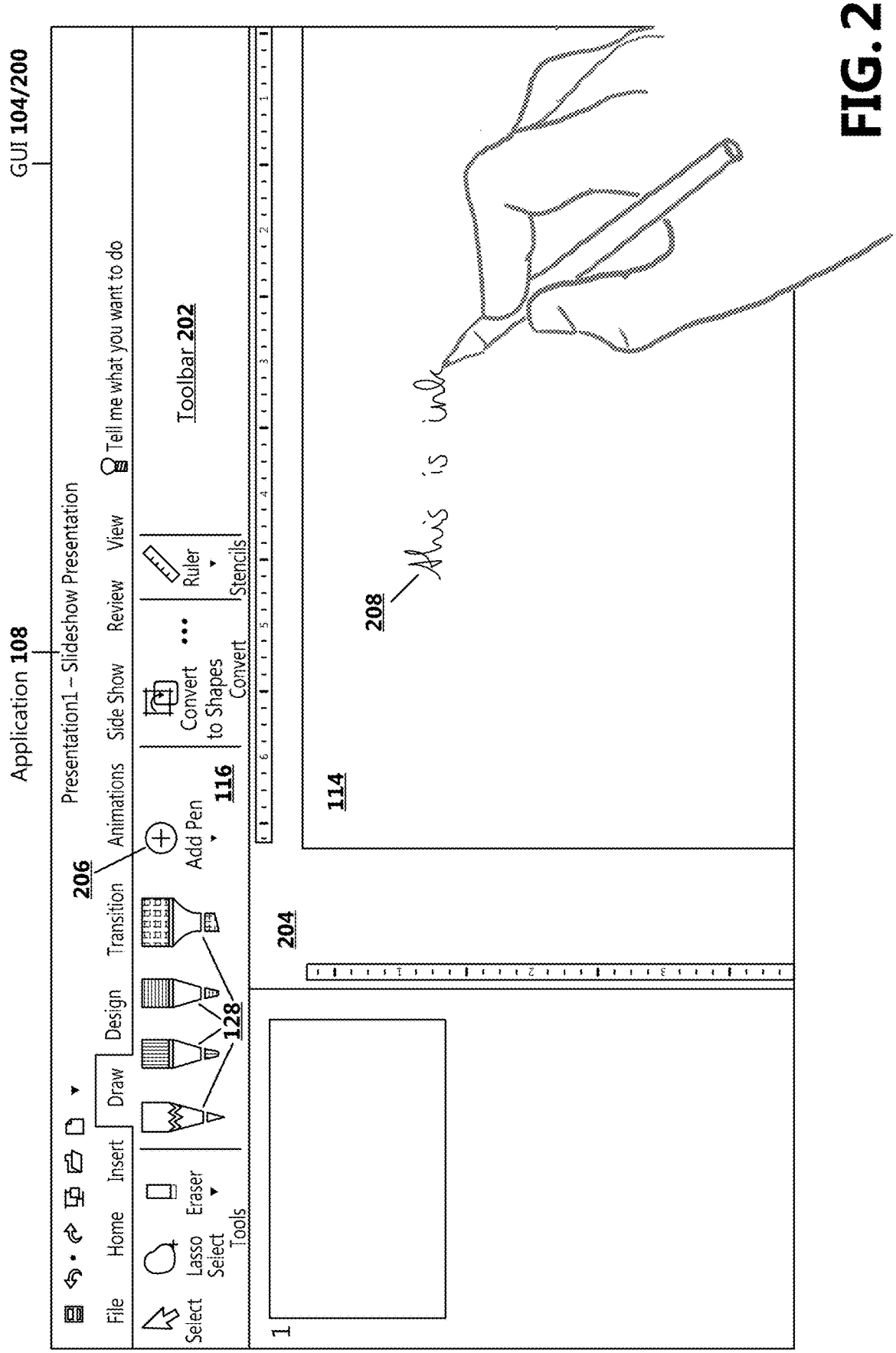
FIG. 2 is an illustration of an example user interface display generated by aspects of an ink-enabled application showing a default set of inking tools being displayed in an example inking tool tray.

Example interfaces associated with a personalized inking tool system are described throughout, including with respect to FIGS. 2-3G. With reference now to FIG. 2, an example GUI 200 generated by aspects of an application 108 and displayed by the user computing device 102 is shown. In this example, the GUI 200 includes a toolbar 202 and a content region display area 204. The content region display area 204 operates to display at least a portion of a content authoring canvas 114. In this example, the content authoring canvas 114 is a slide. Other examples of content authoring canvases include pages and spreadsheets. In some aspects, a user 110 can interact with and modify the content region that is displayed by adding, removing, repositioning, or otherwise modifying various content elements of the content region display area 204. For instance, content 112 in the content region display area 204 may be added or modified via user keystrokes on a keypad such as a physical keyboard or virtual (or soft) keyboard, movement of a mouse pointer or touchpad pointer, or via handwriting or hand-drawing input using a digital pen, stylus, or a finger. According to one aspect, handwritten or hand-drawn input (i.e., inking input 208) is enabled upon selection of an inking tool, such by selecting an inking tool element 128 displayed in an inking tool tray 116.

According to some examples, the inking tool tray 116 is displayed in the toolbar 202. The toolbar 202 includes various tools and settings related to authoring the content. In some examples, the tools and settings in the toolbar 202 are organized in logical groups, which are collected together under tabs. The toolbar 202 may include fewer, additional, or different tools and settings than what is shown in the illustrated example. In some examples, the inking tool tray 116 is displayed outside of the toolbar 202, such as in a pane or displayed along a side of the GUI 104. As described above and as illustrated, the inking tool tray 116 includes a plurality of inking tool elements 128, wherein each inking tool element illustrates properties 126 corresponding to an inking tool for providing inking input 208 within the content authoring canvas 114. According to an aspect, the inking tool tray 116 initially comprises one or more inking tool elements 128 representing a default set of inking tools. For example, the default set of inking tools may comprise a gray pencil having a 1 pt stroke thickness, a red pen having a 1¼ pt stroke thickness, a blue pen having a 1¼ pt stroke thickness, and a yellow highlighter having a 10 pt stroke thickness. According to an aspect, the application 108 is operative to provide an add tool button 206 for allowing the user 110 to add a user-customizable inking tool to the inking tool tray 116.

Figure 3A:
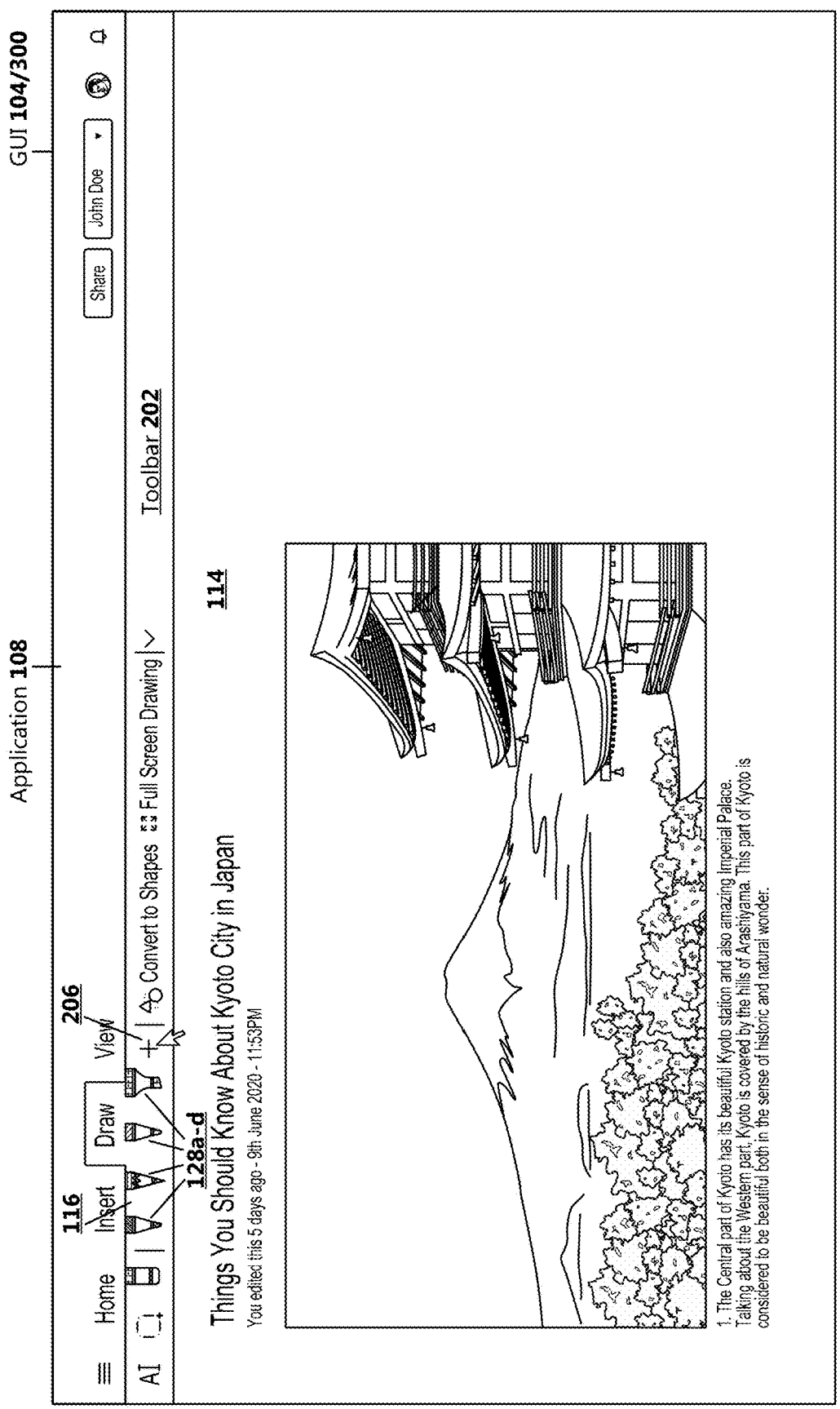
FIG. 3A is an illustration of another example user interface display generated by aspects of an ink-enabled application showing a default set of inking tools being displayed in an example inking tool tray.

With reference now to FIG. 3A, another example GUI 300 generated by aspects of an application 108 and displayed by the user computing device 102 is shown. In this example, the GUI 300 includes a toolbar 202 comprising an inking tool tray 116 and a content region display area 204 displaying a portion of a content authoring canvas 114, which in this example is a page. As illustrated, the inking tool tray 116 comprises a plurality of inking tool elements 128a-d representing a default set of inking tools. According to an aspect, the number, type, and properties of the inking tools in the default set may be application-specific. Further, FIG. 3A shows the user 110 making a selection of an add tool button 206 displayed in the toolbar 202. According to an aspect, the add tool button 206 is a user-actuatable control, that when actuated, causes a display of a customization menu for enabling the user 110 to select properties for a new inking tool. Although the add tool button 206 is described as a button herein, in other aspects, other types of user-actuatable controls are used.

Figure 3B:
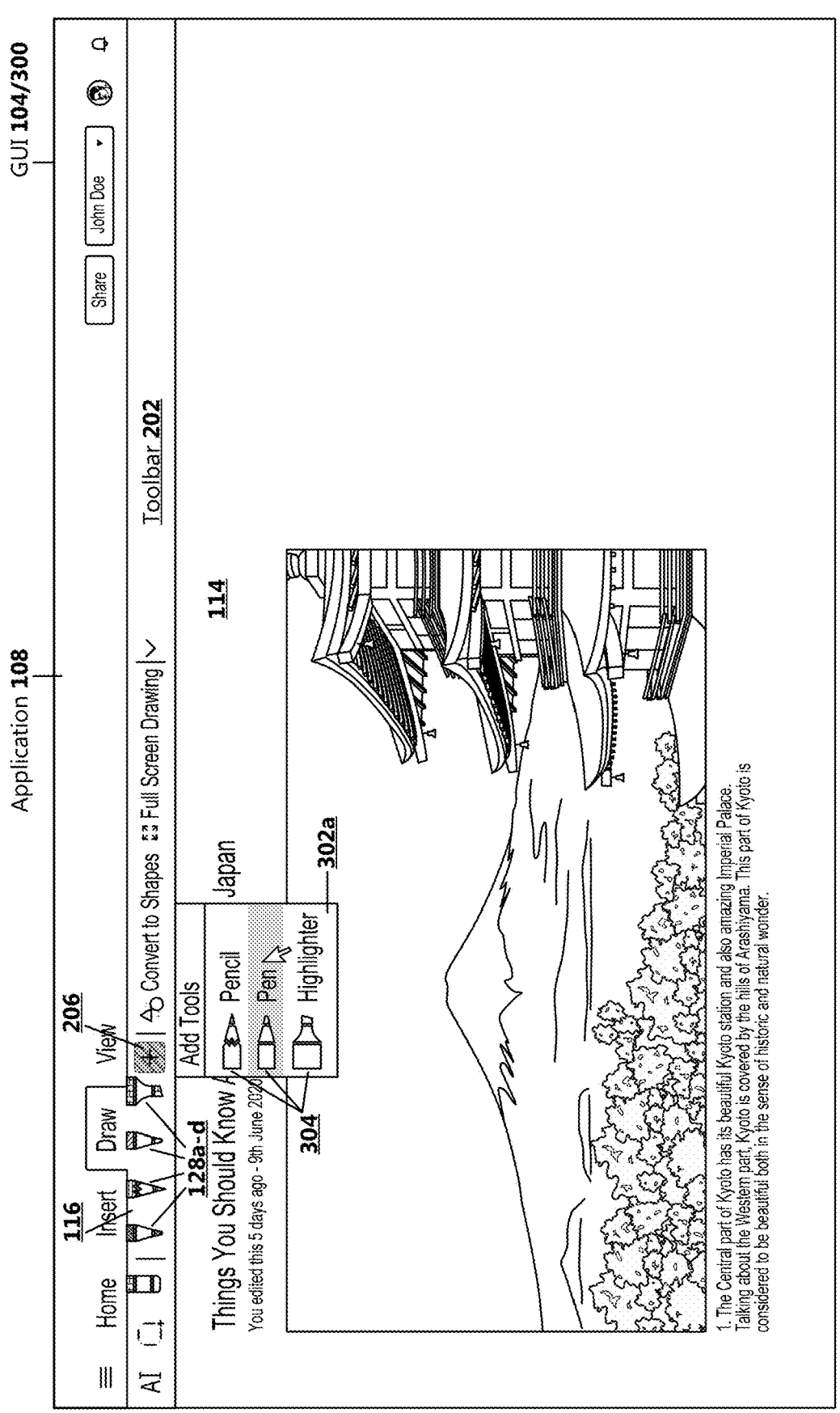
FIG. 3B is an illustration of an example user interface display generated by aspects of an ink-enabled application showing a selection of an option to add a new inking tool.

With reference now to FIG. 3B, responsive to an actuation of the add tool button 206, a customization menu 302 is displayed. In some examples, the customization menu 302 is displayed as a single menu. In other examples, the customization menu 302 includes more than one menu. For example, a first menu 302a may be provided for enabling the user 110 to select a tool type, and a second menu 302b may be provided for enabling the user to select various properties associated with the drawing tool. The example illustrated in FIG. 3B shows a first customization menu 302a of a plurality of customization menus, wherein a plurality of inking tool types 304 are displayed in the first customization menu. The example shows a pencil tool, a pen tool, and a highlighter tool. Other inking tool types 304 are possible and are within the scope of the present disclosure. For example, other inking tool types 304 may include a marker, a crayon, a paintbrush, a calligraphy pen, etc. According to an aspect, certain attributes are automatically linked to certain inking tool types 304. For example, when selecting a paintbrush as the inking tool type 304, specific properties are automatically assigned to the new inking tool, such as ink color, a shape of the ink stroke, a transparency level of the ink stroke, a texture of the ink stroke, etc. In some examples, these automatically linked attributes can be modified by the user 110. Further, FIG. 3B shows the user 110 making a selection of the pen tool type.

Figure 3C:
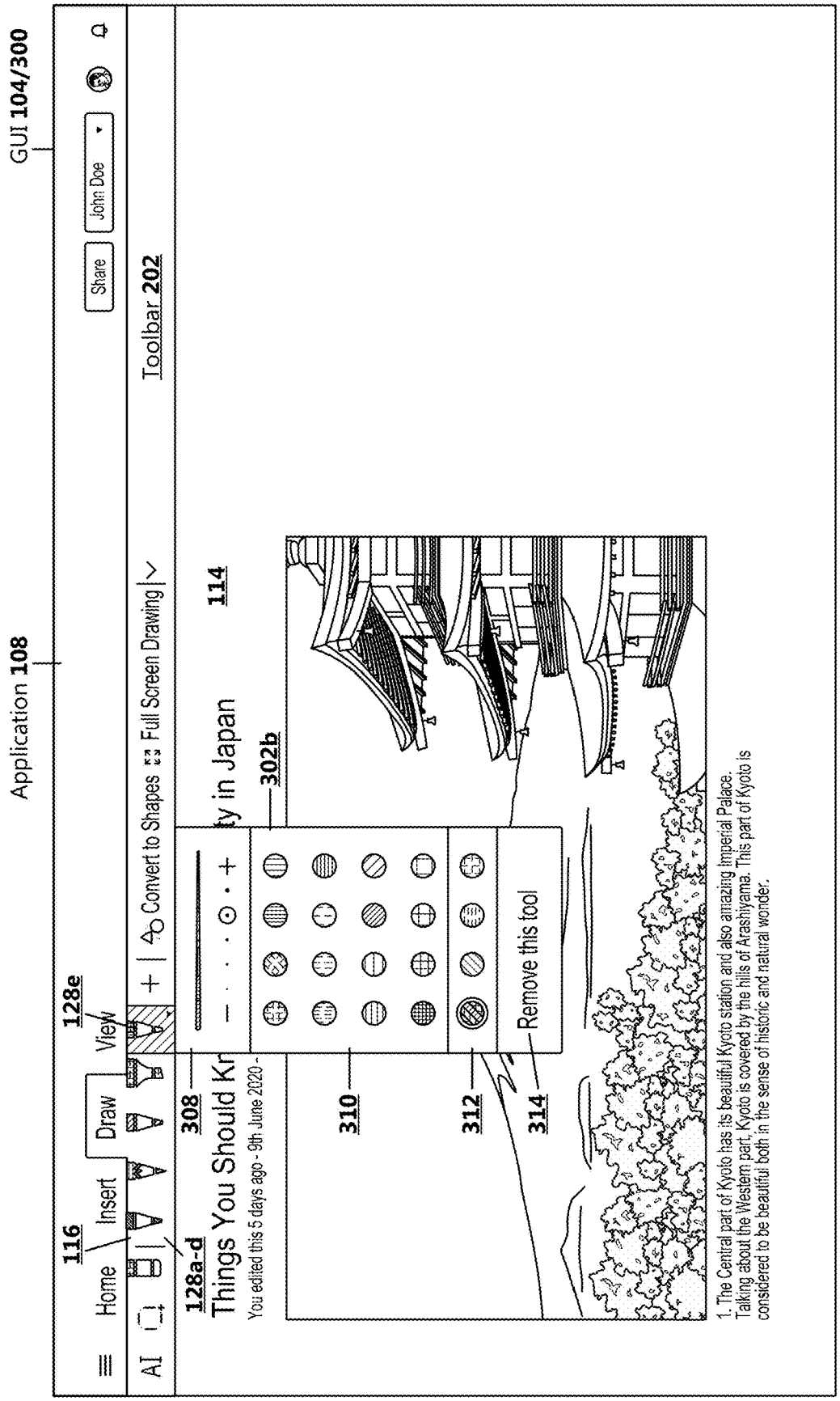
FIG. 3C is an illustration of an example user interface display generated by aspects of an ink-enabled application showing a customization menu presented for selecting properties for the new inking tool.

Responsive to the user's selection of a tool type 304 from the first customization menu 302a and with reference now to FIG. 3C, a new inking tool element 128e corresponding to the new inking tool is added to the inking tool tray 116. In some examples and as illustrated, when a new inking tool is added to the inking tool tray 116, the inking tool element 128*e* corresponding to the new inking tool is added at the end (e.g., far right) of the inking tool tray. Further, the new inking tool is set as the active tool. For example, the inking tool element 128*e* corresponding to the new inking tool may be highlighted. According to an aspect, the inking tool tray 116 automatically accommodates the new inking tool element 128*e*. In some examples, the inking tool tray 116 expands to accommodate the new inking tool element 128*e*, which may or may not include a visual expansion in the size of the inking tool tray.

Further, a second customization menu 302*b* is automatically opened for enabling the user 110 to select various properties 126 to associate with the new inking tool. In one example, a thickness selector 308 is provided in the second customization menu 302*b* for allowing the user 110 to set a stroke thickness to assign to the new inking tool. In another example, a color selector 310 is provided in the second customization menu 302*b* for allowing the user 110 to select a color to assign to the new inking tool. In another example, an effects selector 312 is provided in the second customization menu 302*b* for allowing the user 110 to select an ink effect to assign to the new inking tool. Other inking tool properties 126 and customizations are possible and are within the scope of the present disclosure. Although the various property selectors 308,310,312 are shown displayed in a single customization menu 302*b*, the selectors may be displayed separately or in combination in one or a plurality of customization menus. In some examples, a tool removal option 314 is provided for allowing the user 110 to remove a selected tool from the inking tool tray 116.

Figure 3D:
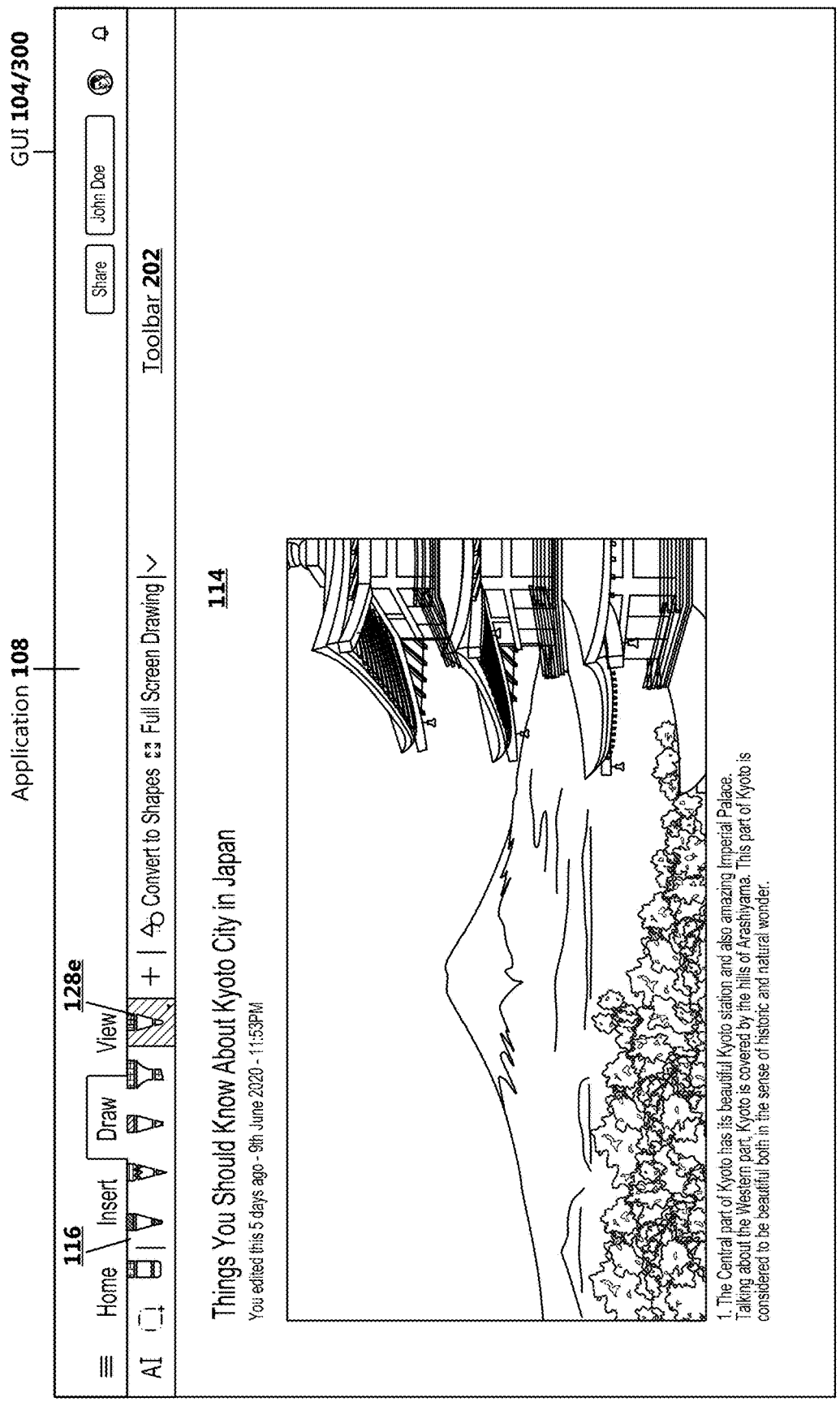
FIG. 3D is an illustration of an example user interface display generated by aspects of an ink-enabled application showing the new inking tool added to the inking tool tray.

According to an aspect and as illustrated in FIG. 3D, selections of inking tool properties 126 are applied to the new inking tool. Further, upon selection of an inking tool property, the corresponding inking tool element 128*e* is updated with the selection(s) made by the user 110. According to an aspect, the selected inking tool properties 126 are saved. For example, the application 108 communicates with a server computing device 124 over a network 120, wherein the server computing device 124 stores the user-selected inking tool properties 126 associated with the new inking tool in a data store 118.

With reference now to FIG. 3E, with the new inking tool 128*e* set as the active tool 322, the inking tool properties 126 selected by the user 110 and illustratively displayed via the corresponding inking tool element 128*e* are applied to the current/active inking tool 322 via which the user 110 is enabled to provide inking input 208 in the content authoring canvas 114. Accordingly, as the user 110 provides inking input 208 onto the content authoring canvas 114, the inking input assumes the user-selected properties 126 of the new inking tool. According to examples, the user 110 is enabled to modify the properties 126 associated with an inking tool. For example, the user 110 may select an inking tool element 128 of the active inking tool 322 displayed in the inking tool tray 116. Responsive to the selection, a customization menu, such as the customization menu 302*b* illustrated in FIG. 3C, is displayed to allow the user to select different properties for the inking tool corresponding to the selected inking tool element 128.

Figure 3F:
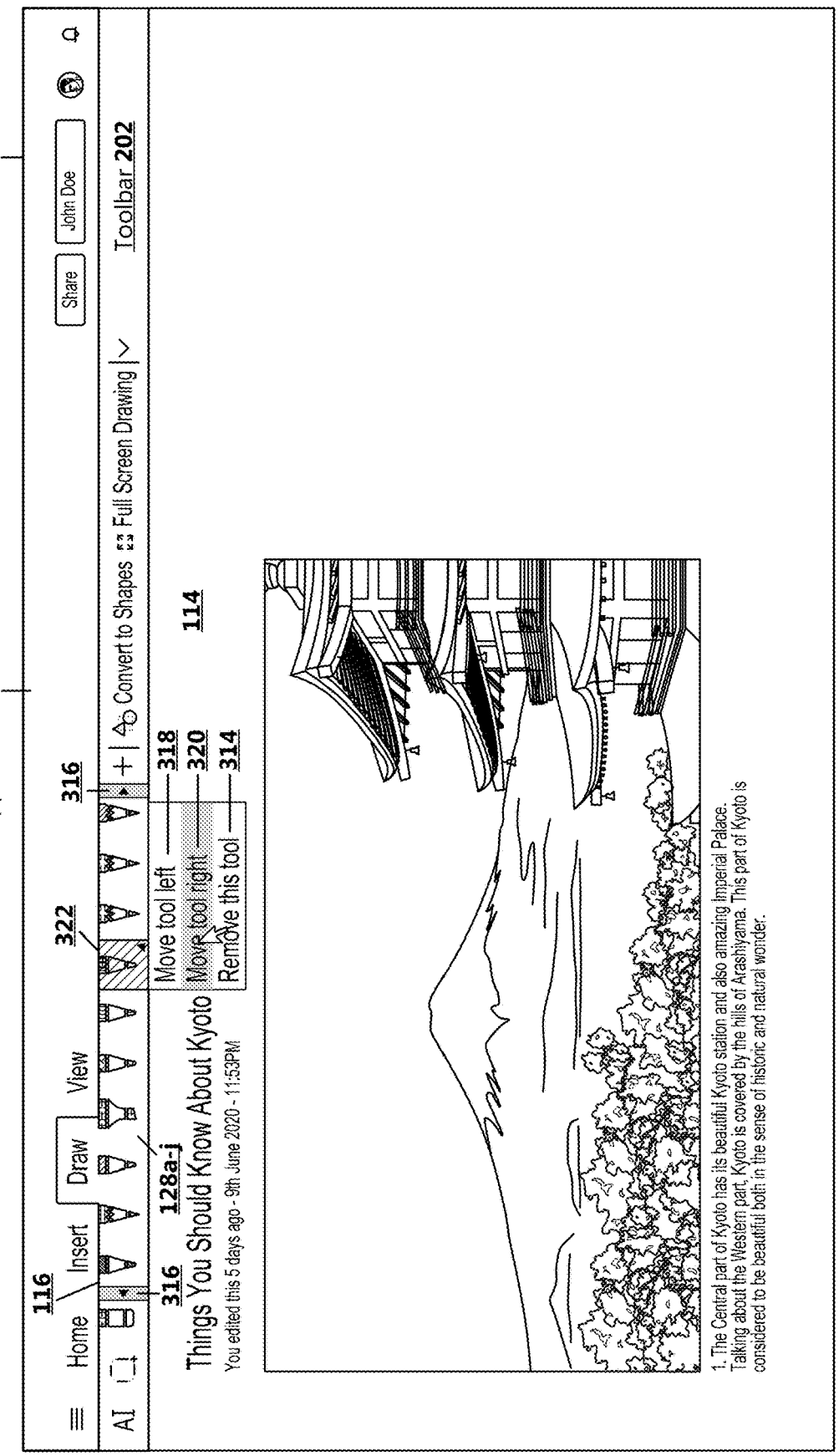
FIG. 3F is an illustration of an example user interface display generated by aspects of an ink-enabled application showing options to reconfigure inking tool elements in the inking tool tray.

The user 110 is enabled to add a plurality of new inking tools to the user's personalized inking tool tray 116. In some examples, an application 108 may have a maximum number of tools that can be added. As described above, when a new inking tool element 128 is added to the inking tool tray 116, the tray expands to accommodate the new inking tool element. According to an example, the user 110 is enabled to rearrange the inking tool elements 128 displayed in the inking tool tray 116. For example, the user 110 may drag and drop an inking tool element 128 to a desired location in the inking tool tray 116. In some examples and as illustrated in FIG. 3F, a move tool left option 318 and a move tool right option 320 are provided for enabling the user 110 to rearrange inking tool elements 128 in the inking tool tray 116. In the illustrated example, the move tool left option 318 and the move tool right option 320 are displayed in a context menu; however, in other examples, the options may be displayed elsewhere in the GUI 104.

There are times when all the inking tool elements 128 in an inking tool tray 116 may not be displayed at once. For example, the inking tool tray 116 may include a large number of inking tool elements 128, or the available display space for the inking tool tray may be decreased because of screen size or because of resizing of the application GUI 104. Accordingly, the ink-enabled application 108 is operative to display a portion of the inking tool tray 116, wherein the inking tool tray is scrollable. In some examples, scrolling handles 316 are provided for enabling scrolling of the inking tool tray 116. In other examples, the user 110 is enabled to scroll through inking tool elements 128 displayed in the inking tool tray 116 via swiping a finger, mouse cursor, or other input device 106 cursor across the inking tool tray.

As described above, the inking tool tray 116 is consistent across applications 108 and computing devices 102, allowing the user 110 to create, keep, and roam a customized set of inking tools. With reference now to FIG. 3G, the inking tool tray 116 is shown displayed in example user interface displays 104*a,b* generated by ink-enabled applications 108*a,b* displayed on different computing devices 102*a,b,c*. For example, on a first computing device 102*a*, embodied as a desktop computing device, two ink-enabled applications 108*a,b* are opened. For example, the first ink-enabled application 108*a* may be a word processing application, and the second ink-enabled application 108*b* may be a slide presentation application. The inking tool tray 116 comprising the same set of inking tool elements 128 corresponding to the same set of inking tools are displayed in both ink-enabled application GUIs 104*a,b*. The user 110 is enabled to select an inking tool element 128 from the inking tool tray 116 with a single click to set an active inking tool 322 to assume the user-selected properties 126 of the selected inking tool element for providing inking input 208 in the content authoring canvas 114*a,b*.

As illustrated, the second ink-enabled application 108*b* is shown executing on a second computing device 102*b* embodied as a tablet computing device. The inking tool tray 116 displayed in the GUI 104*b* of the second ink-enabled application 108*b* displayed on the second computing device 102*b* comprises the same set of inking tool elements 128 corresponding to the same set of inking tools as the second ink-enabled application executing on the first computing device 102*a*. Again, the user 110 is enabled to easily and efficiently select an inking tool element 128 from the inking tool tray 116 to set an active inking tool 322 to assume the user-selected properties 126 of the selected inking tool element for providing inking input 208 in the content authoring canvas 114*c*.

Referring still to FIG. 3G, the first ink-enabled application 108*a* is shown executing on a third computing device 102*c* embodied as a mobile communication device. The user 110 has access to the set of inking tool elements 128 corresponding to the set of inking tools that the user customized for the user's inking tool tray 116. The user 110 is enabled to efficiently select a desired inking tool element 128 from the inking tool tray 116 to set as the activing inking tool 322.

Accordingly, the user-selected properties 126 of the selected inking tool element 128 are applied to the active inking tool for enabling the user 110 to provide inking input 208 consistent with the user-selected properties in the content authoring canvas 114d.

Figure 4:
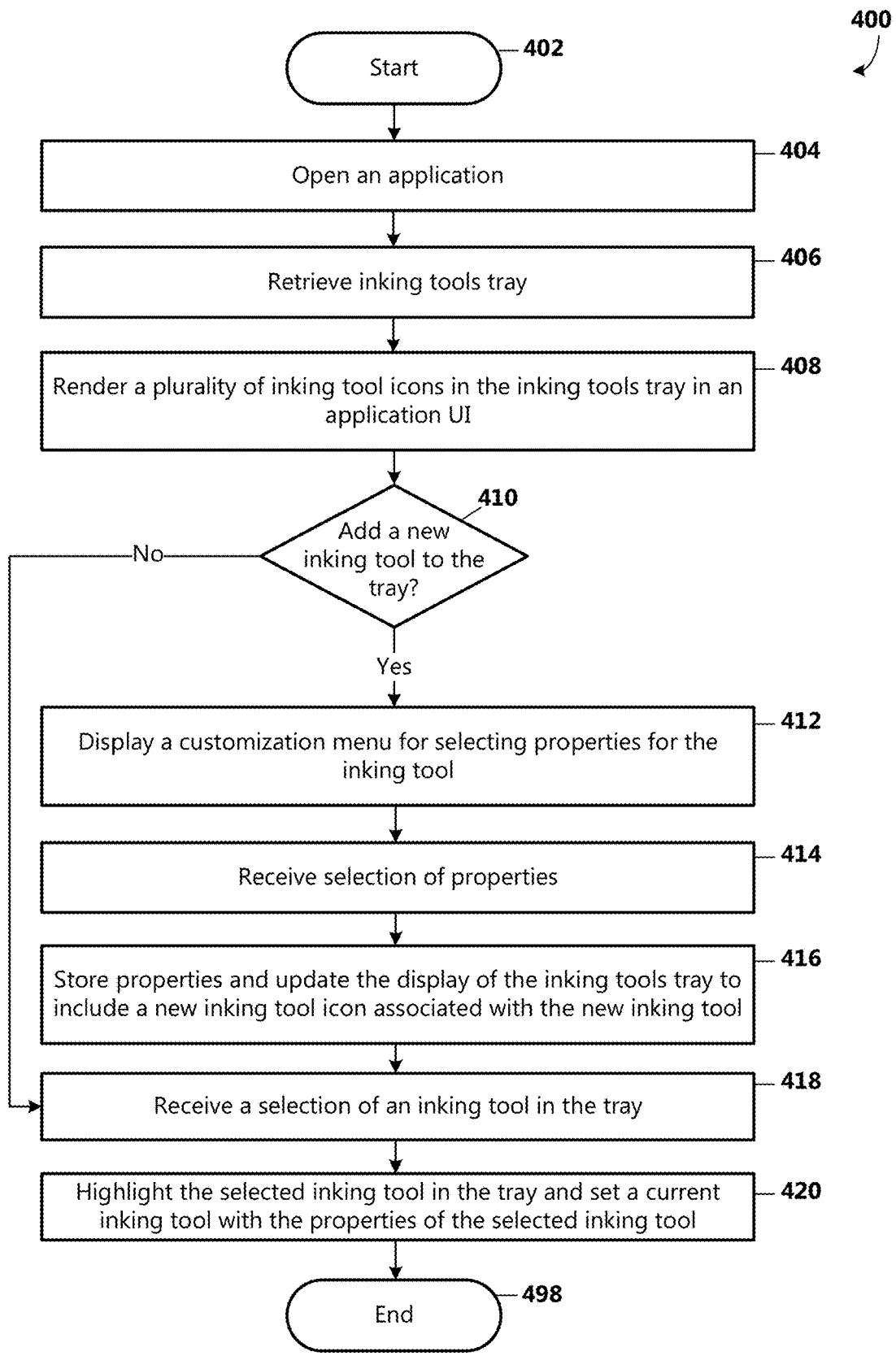
FIG. 4 is a flow chart showing general stages involved in an example method for providing a personalized persistent collection of customized inking tools.

Having described an operating environment and various user interface display examples with respect to FIGS. 1-3G, FIG. 4 is a flow chart showing general stages involved in an example method 400 for providing a personalized persistent collection of customized inking tools. With reference now to FIG. 4, the method 400 begins at start OPERATION 402, and proceeds to OPERATION 404, where an ink-enabled application 108 is opened on a computing device 102. As described above, the application 108 may be one of various types of applications for performing various tasks, wherein the application is operative to receive handwritten or hand-drawn input collected from an input device 106, such as a tablet pen, a finger, a mouse, or other device, and to visually represent the inking input 208 on a content authoring canvas 114.

The method 400 proceeds to OPERATION 406, where the inking tool tray 116 is retrieved. Upon initial use or prior to the user 110 customizing an inking tool tray 116, the application 108 may retrieve an inking tool tray comprising a set of default inking tools. If the user 110 has customized an inking tool tray 116, the application 108 retrieves user-selected inking tool properties 126 from a data store 118 on a server computing device 124.

At OPERATION 408, the inking tool tray 116 including a plurality of inking tool elements 128 is displayed in the application GUI 104. As described above, the inking tool elements 128 illustrate default inking tool properties or the user-selected inking tool properties 126 retrieved from the data store 118. In some examples, the inking tool tray 116 is displayed in the toolbar 202 of the application. In other examples, the inking tool tray 116 is displayed elsewhere in the application GUI 104.

The method 400 proceeds to DECISION OPERATION 410, where a determination is made as to whether to add a new inking tool to the inking tool tray 116. For example, the determination may be made based on whether a selection of the add tool button 206 is received. In response to a selection of the add tool button 206, the method 400 proceeds to OPERATION 412, where a customization menu 302 for an inking tool type 304 and for selecting properties 126 for the new inking tool is displayed. As described above, the customization menu 302 may be a single menu or a plurality of menus.

At OPERATION 414, properties 126 for the new inking tool are selected by the user 110. For example, the user 110 may select a desired inking tool type 304, which may be linked to attributes such as stroke shape, stroke transparency, stroke texture, etc. Further, the user may select a desired stroke thickness, color, or ink effect to apply to the new inking tool.

Responsive to the property selections made by the user 110, the method 400 proceeds to OPERATION 416, where the inking tool tray 116 is expanded to display a new inking tool element 128e corresponding to the new inking tool, wherein the new inking tool element illustrates the property selections made by the user 110. For example, the new inking tool element 128e may be an image or a portion of an image of the "real-world" drawing implement it represents (e.g., the inking tool element for a yellow highlighter inking tool may be displayed as a highlighter maker tip having yellow ink and a barrel resembling an actual highlighter).

Further, the properties 126 selected by the user 110 are stored in a data store 118 on a server computing device 124.

The method 400 proceeds to OPERATION 418, where a selection of an inking tool element 128 in the inking tool tray 116 is received. Responsive to the selection of the inking tool element 128, the method proceeds to OPERATION 420, where the inking tool corresponding to the selected inking tool element 128 is set as the active inking tool 322. Accordingly, the user 110 is enabled to apply inking input 208 to the content authoring canvas 114, wherein the properties 126 associated with the selecting inking tool are applied to the inking input. The method 400 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
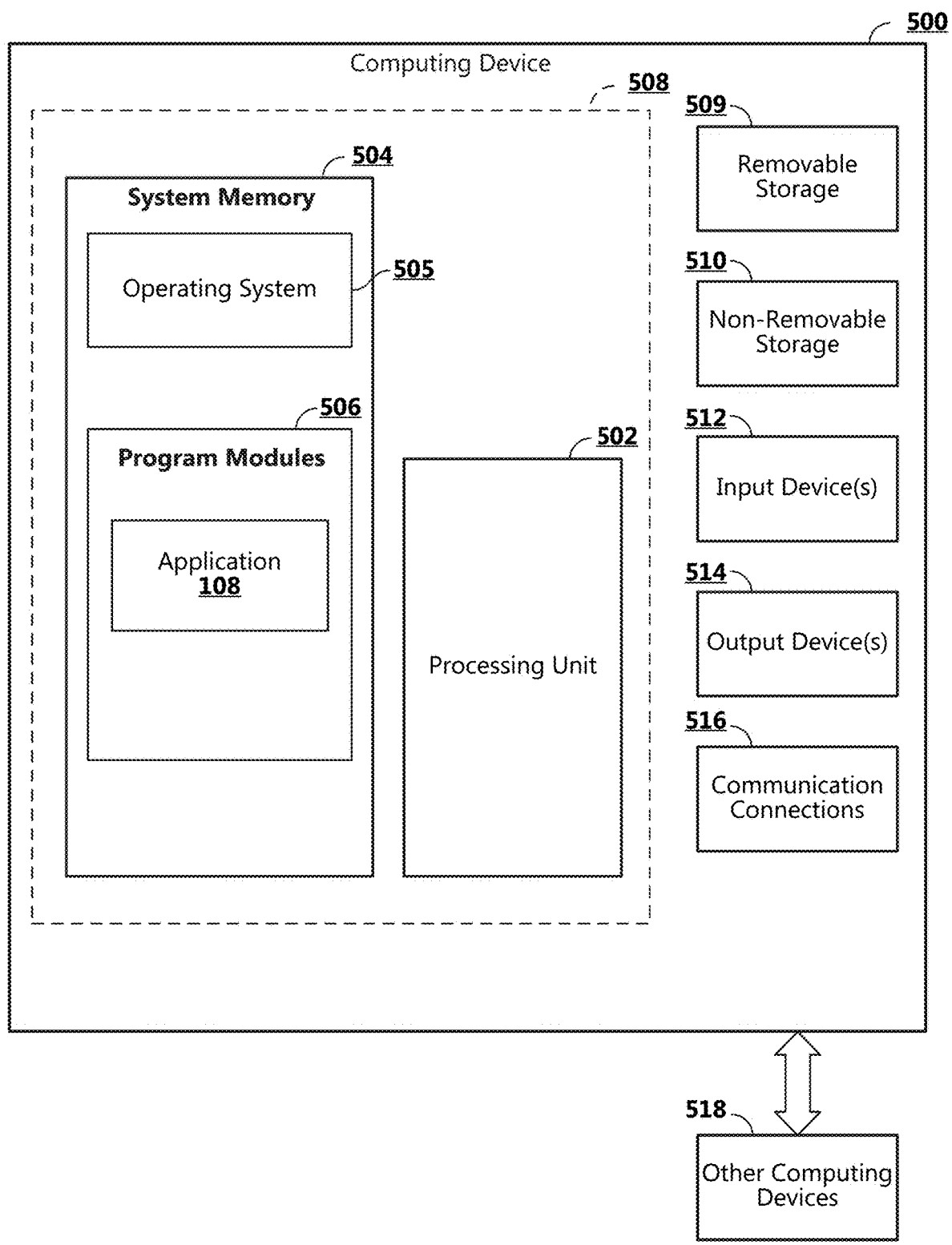
FIG. 5 is a block diagram illustrating example physical components of a computing device.
Figure 6A:
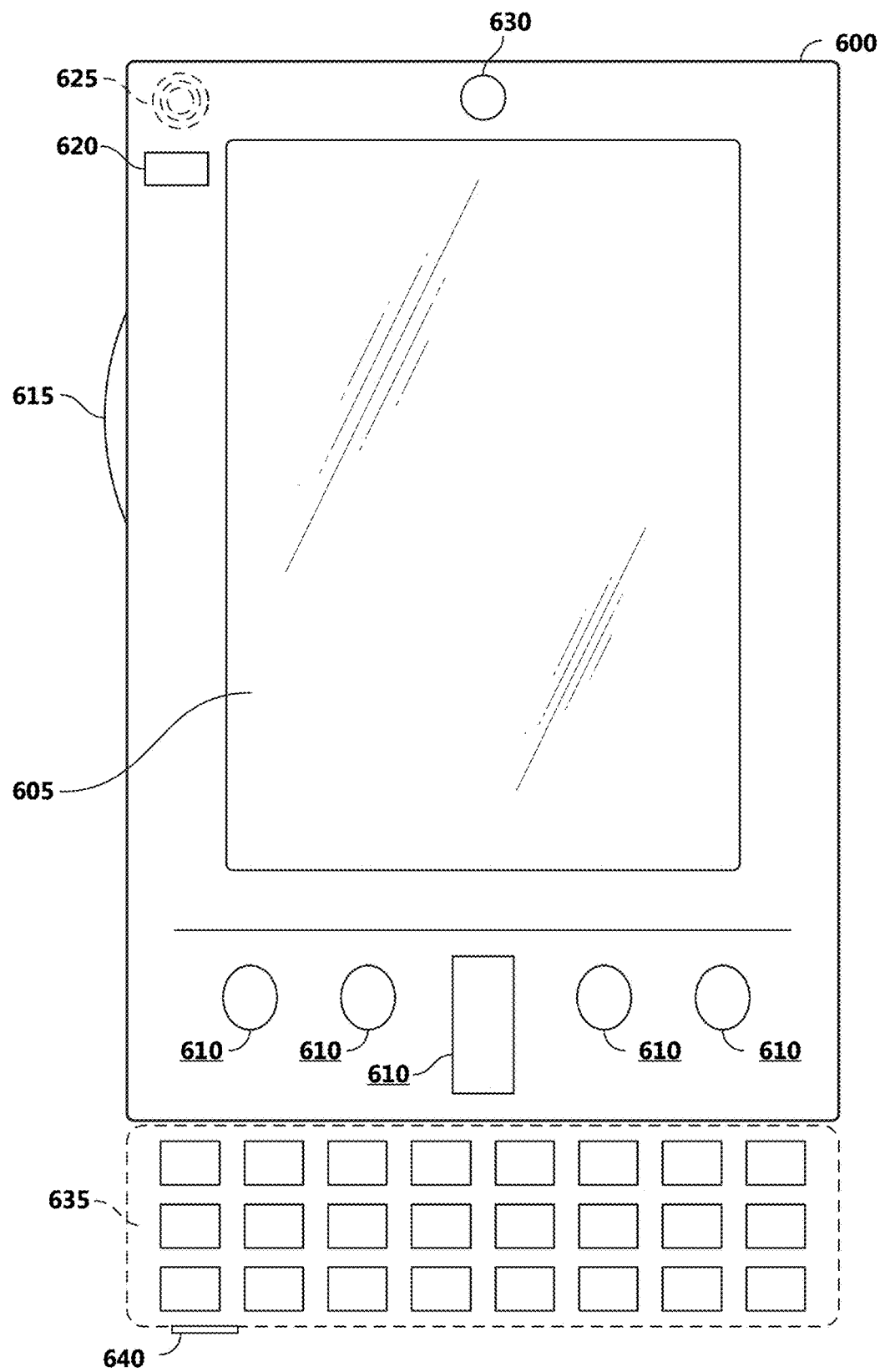
FIGS. 6A and 6B are simplified block diagrams of a mobile computing device.
Figure 6B:
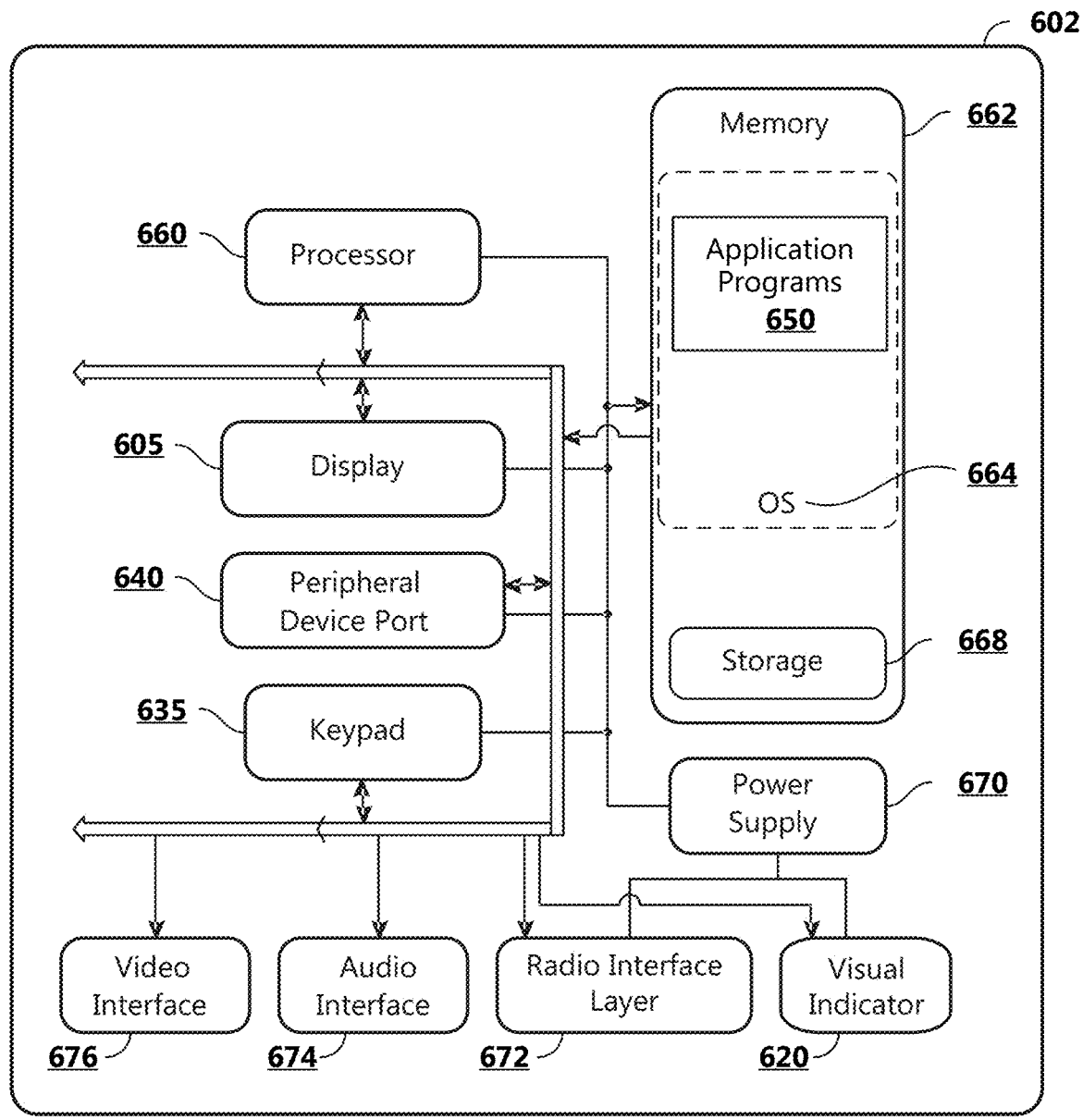
Figure 7:
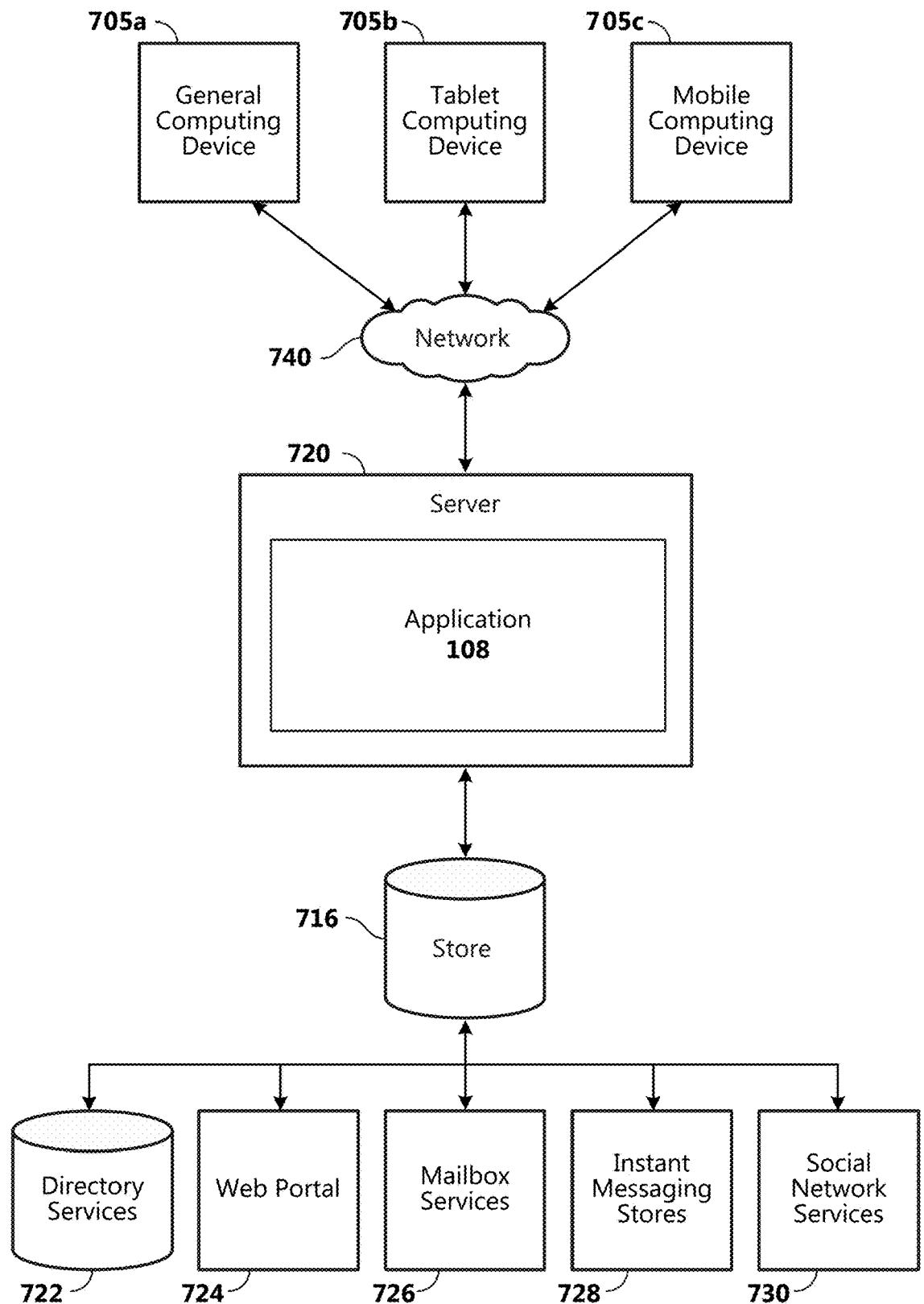
FIG. 7 is a simplified block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the ink-enabled application 108. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., ink-enabled application 108) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the ink-enabled application 108 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for providing a personalized persistent collection of customized inking tools as described above. Content developed, interacted with, or edited in association with the ink-enabled application 108 is enabled to be stored in different communication channels or other storage types. For example, various documents may be stored using a directory service 722, a web portal 724, a mailbox service 726, an instant messaging store 728, or a social networking site 730. The ink-enabled application 108 is operative to use any of these types of systems or the like for providing a personalized persistent collection of customized inking tools, as described herein. According to an aspect, a server 720 provides the ink-enabled application 108 to clients 705a,b,c. As one example, the server 720 is a web server providing the ink-enabled application 108 over the web. The server 720 provides the ink-enabled application 108 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing a personalized persistent collection of customized inking tools, comprising:
    displaying a user interface of an application within a display of an electronic computing device, the user interface including a content authoring canvas and an inking tool tray, wherein the inking tool tray includes a user-actuatable control for adding a new inking tool to the inking tool tray;
    in response to an actuation of the control for adding the new inking tool to the inking tool tray, displaying a first customization menu connected to the inking tool tray to allow a user to select a tool type for the new inking tool;
    in response to a selection of a tool type for the new inking tool, adding a new inking tool element to the inking tool tray and displaying a second customization menu connected to the new inking tool element to allow the user to select one or more of a plurality of tool properties for the new inking tool, the tool properties comprising one or more of stroke thickness, ink color, and ink effect;
    in response to a selection of one or more properties for the new inking tool on the second customization menu, illustrating a type and color of the new inking tool on the new inking tool element, wherein the inking tool tray automatically accommodates the new inking tool element so that the new inking tool element is persistently displayed when the inking tool tray is displayed;
    communicating with a server computing device for storing the one or more properties for the new inking tool in a data store, wherein the new inking tool and its properties are accessible from the data store by a plurality of ink-enabled applications executing on a plurality of electronic computing devices; and
    in response to receiving a selection of one of the inking tool elements in the inking tool tray, setting an active inking tool for providing inking input in the content authoring canvas to have the one or more properties of the selected inking tool element.

2. The method of claim 1, wherein setting the active inking tool for providing inking input in the content authoring canvas to have the one or more properties of the selected inking tool element further comprises highlighting the selected inking tool element within the inking tool tray.

3. The method of claim 2, further comprising, in response to receiving a second selection of the highlighted inking tool element within the inking tool tray, displaying the customization menu to allow the user to select different properties for the selected inking tool, the properties comprising at least one of an inking tool type, an inking tool color, and a stroke thickness.

4. The method of claim 3, further comprising, in response to receiving a selection of different properties for the selected inking tool, updating the display of the inking tool element corresponding to the selected inking tool to illustrate the different properties for the selected inking tool.

5. The method of claim 3, wherein in response to receiving the first or second selection of one of the inking tool elements in the inking tool tray, providing an option to delete the selected inking tool element from the inking tool tray.

6. The method of claim 1, wherein:
    adding a new inking tool element to the inking tool tray to illustrate a type and color of the new inking tool, wherein the inking tool tray automatically accommodates the new inking tool element comprises expanding the inking tool tray; and
    displaying the user interface of the application comprises displaying a toolbar in the user interface, the inking tool tray taking up a portion of the toolbar and including scroll handles to enable scrolling of the inking tool tray when an amount of display space for the inking tool tray is less than the size of the inking tool tray.

7. The method of claim 1, further comprising:
    displaying a user interface within a display of an electronic computing device, the user interface including a content authoring canvas, the inking tool tray, and a user-actuatable control for adding an inking tool to the inking tool tray; and
    displaying the plurality of inking tool elements within the inking tool tray, wherein the plurality of inking tool elements include the new inking tool element corresponding to the new inking tool.

8. The method of claim 1, wherein displaying the plurality of inking tool elements within the inking tool tray comprises displaying photo-realistic likenesses to actual drawing implements having the same properties.

9. The method of claim 1, wherein the tool type comprises one of a pencil, a pen, and a highlighter.

10. A system for providing a personalized persistent collection of customized inking tools, the computing device comprising:
    at least one processing device; and
    at least one computer readable data storage device storing instructions that, when executed by the at least one processing device, cause the computing device to:
        display a user interface of an application within a display of an electronic computing device, the user interface including a content authoring canvas and an inking tool tray, wherein the inking tool tray includes a user-actuatable control for adding a new inking tool to the inking tool tray;
        in response to an actuation of the control for adding the new inking tool to the inking tool tray, display a first customization menu connected to the inking tool tray to allow a user to select a tool type for the new inking tool;
        in response to the selection of the new inking tool and the one or more properties for the new inking tool, displaying a second customization menu connected to the new inking tool to allow the user to select one or more of a plurality of tool properties for the new inking tool, the tool properties comprising one or more of stroke thickness, ink color, and ink effect;

in response to a selection of one or more properties for the new inking tool on the second customization menu, illustrating a type and color of the new inking tool on the new inking tool element, wherein the inking tool tray automatically accommodates the new inking tool element so that the new inking tool element corresponding to the new inking tool is persistently displayed when the inking tool tray is displayed;

communicate with a server computing device for storing the one or more properties for the new inking tool in a data store, wherein the new inking tool and its properties are accessible from the data store by a plurality of ink-enabled applications executing on a plurality of electronic computing devices; and in response to receiving a selection of one of the inking tool elements in the inking tool tray, set an active inking tool for providing inking input in the content authoring canvas to have the one or more properties of the selected inking tool element.

11. The system of claim 10, wherein in response to receiving a second selection of the selected inking tool element within the inking tool tray, the system is further operative to display the customization menu to allow the user to select different properties for the selected inking tool, the properties comprising at least one of an inking tool type, an inking tool color, and a stroke thickness.

12. The system of claim 11, wherein in response to receiving a selection of different properties for the selected inking tool, the system is further operative to update the display of the inking tool element corresponding to the selected inking tool to illustrate the different properties for the selected inking tool.

13. The system of claim 11, wherein in response to receiving the first or the second selection of one of the inking tool elements in the inking tool tray, the system is operative to provide an option to delete the selected inking tool element from the inking tool tray.

14. The system of claim 10, wherein a default set of inking tools comprises at least three different inking tools, and wherein at least two inking tools within the default set of inking tools are of the same inking tool type having different colors.

15. The system of claim 10, wherein the tool type comprises one of comprises a pencil, a pen, and a highlighter.

16. A computer readable storage device including computer readable instructions, which when executed by a processing unit is operative to:

display a user interface of an application within a display of an electronic computing device, the user interface including a content authoring canvas and an inking tool tray, wherein the inking tool tray includes a user-actuatable control for adding a new inking tool to the inking tool tray;

in response to an actuation of the control for adding the new inking tool in the inking tool tray, display a first customization menu connected to the inking tool tray to allow a user to select a tool type for the new inking tool;

in response to the selection of the new inking tool and the one or more properties for the new inking tool, displaying a second customization menu connected to the new inking tool to allow the user to select one or more of a plurality of tool properties for the new inking tool, the tool properties comprising one or more of stroke thickness, ink color, and ink effect;

in response to a selection of one or more properties for the new inking tool on the second customization menu, illustrate the type and color of the new inking tool on the new inking tool element, wherein the inking tool tray expands automatically to accommodate the new inking tool element, and wherein the expanded inking tool tray with the new inking tool element corresponding to the new inking tool is persistently displayed when the inking tool tray is displayed;

communicate with a server computing device for storing the one or more properties for the new inking tool in a data store, wherein the new inking tool and its properties are accessible by a plurality of ink-enabled application executing on a plurality of electronic computing devices; and in response to receiving a selection of one of the inking tool elements in the inking tool tray, set an active inking tool for providing inking input in the content authoring canvas to have the one or more properties of the selected inking tool element.

17. The computer readable storage device of claim 16, wherein:

in response to receiving a second selection of the selected inking tool element within the inking tool tray, the device is further operative to display the customization menu to allow the user to select different properties for the selected inking tool, the properties comprising at least one of an inking tool type, an inking tool color, and a stroke thickness; and in response to receiving a selection of different properties for the selected inking tool, the device is further operative to update the display of the inking tool element corresponding to the selected inking tool to illustrate the different properties for the selected inking tool.

18. The computer readable storage device of claim 16, wherein the tool type comprises one of a pencil, a pen, and a highlighter.

* * * * *